Feb. 18, 1936.  E. H. LAND  2,031,045
MEANS FOR AVOIDING GLARE FROM AUTOMOBILE HEADLIGHTS
Filed Jan. 16, 1933
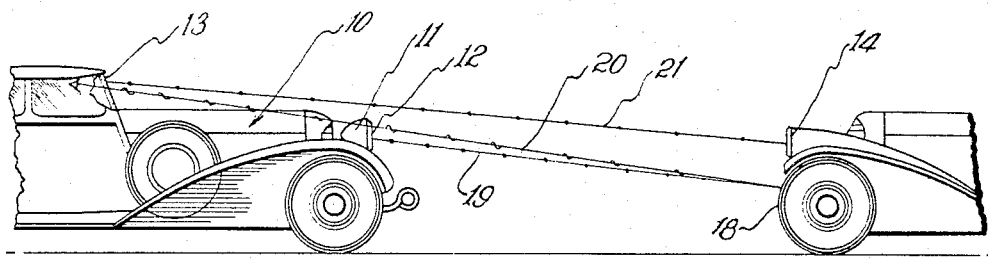
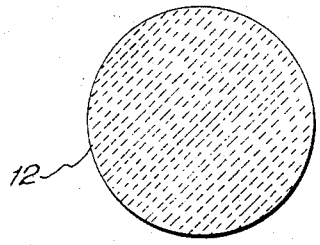
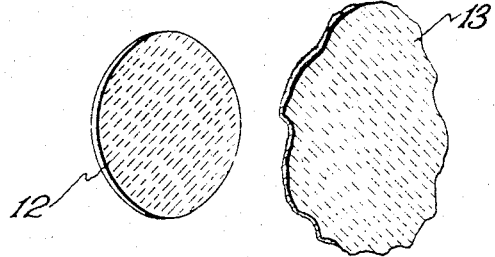
INVENTOR
Edwin H. Land
BY
Warfield & Brown
ATTORNEY Patented Feb. 18, 1936

2,031,045

UNITED STATES PATENT OFFICE 2,031,045

MEANS FOR AVOIDING GLARE FROM AUTOMOBILE HEADLIGHTS

Edwin H. Land, Wellesley Farms, Mass., assignor to Sheet Polarizer Company, Inc., Union City, N. J., a corporation of New Jersey Application January 16, 1933, Serial No. 651,952
In Canada December 6, 1932

10 Claims. (Cl. 88—1)

This invention relates to means for avoiding glare from the headlights of automotive vehicles and the like.

This application is a continuation in part of my copending application Serial No. 331,967, filed January 12, 1929.

The invention has for its object generally an improved construction and arrangement of parts for avoiding glare from headlights and similar sources of light in an efficient and economical manner.

More particularly, an object of the invention is to provide a source of illumination which gives light of a character from which the glaring characteristics may be readily controlled and substantially cut off by means arranged to cooperate therewith and which still admits of adequate vision.

A further object of the invention is to provide means for diminishing or eliminating the glare from sources of illumination by interposing between the said source and the person viewing said source a plurality of polarizing bodies each comprising a set or hardened transparent suspending medium in which are embedded colloidal polarizing particles with their axes of polarization substantially aligned.

Other objects of the invention will in part be obvious and will in part appear hereinafter.

The invention accordingly comprises the features of construction, combination of elements and arrangement of parts which will be exemplified in the construction hereinafter set forth and the scope of the application of which will be indicated in the claims.

For a fuller understanding of the nature and objects of the invention, reference should be had to the following detailed description taken in connection with the accompanying drawing in which:

Fig. 1 is a fragmentary view illustrating somewhat schematically an embodiment of the invention as applied to automobiles.

Fig. 2 is a plan view of a portion of the lens and/or windshield of one of the automobiles shown in Fig. 1 in which broken lines illustrate a characteristic of the light modification employed in accordance with the invention; and Fig. 3 is a schematic view of a lens of one of the automobiles shown in Fig. 1 and the windshield of the other of the automobiles shown in Fig. 1 in which broken lines illustrate a characteristic of the light modification employed in accordance with the invention.

Referring now to the drawing, and more particularly to Fig. 1, 10 denotes an automotive vehicle in which the headlights, as indicated at 11, are provided with polarizing bodies such as shown at 12 for modifying the light emitted so as to be of a character from which the glare may be readily eliminated by suitable cooperating means used by an operator of an approaching car. To this end the car 10 has a windshield or visor 13 adapted to reduce or substantially cut off light of a similar character when emitted from a headlight of a similarly equipped car, for example, from the headlight shown at 14.

In accordance with the present invention headlights or other light sources are equipped with polarizing bodies so that the character of the light which they emit is polarized, preferably, plane polarized. The means to be used by the operator of one car to reduce or cut out glare from the headlights of an approaching car is also adapted to transmit only polarized light and preferably only plane polarized light. This means is preferably so positioned with respect to the polarizing body associated with the light source as to block or substantially block the polarized light emitted therefrom. For example, where the light source emits light polarized in a horizontal plane the windshield or visor 13 will transmit only light which is polarized in a vertical plane.

In my copending application Serial No. 434,833, filed March 10, 1930, an improved polarizing body is described comprising a transparent set suspending medium having a mass of colloidal polarizing particles dispersed therein with their polarizing axes oriented to substantially parallelism. Such a polarizing body is admirably adapted for use in connection with the light source described herein, and also is admirably adapted for use as the visor or windshield through which said light source may be viewed.

As shown in the drawing, and particularly in Fig. 1, the polarization of the light emitted from the headlight 11 is accomplished by associating with said headlight a polarizing body 12 formed as a relatively thin sheet. The sheet may be either suitably affixed to the headlight lens, by any suitable transparent cement, or the polarizing body may be supported independently of the lens but so positioned as to lie directly in the path of the beam of light emitted therefrom.

It is desirable that the polarizing body transmit light of all colors. The polarizing body disclosed in my copending application Serial No. 434,833, filed March 10, 1930, possesses this quality. Preferably such a polarizing body comprises a dispersion of colloidal herapathite (sulphate of iodo-quinine) in a suspending medium comprising nitrocellulose and an acetate non-solvent of herapathite, such, for example, as amyl- or butyl acetate. The suspension of the herapathite in the suitable suspending medium may be caused to permanently set or harden by evaporation of some of the acetate from the suspension. Before this setting or hardening is accomplished the colloidal particles within the suspension may be oriented by subjecting the suspension and the colloid contained therein to the action of pure stretch as described and claimed, for example, in my Patent No. 1,989,371, issued January 29, 1935. Other methods of orienting the polarizing particles within the suspension may, of course, be employed. For example, the suspension while in fluid condition may be subjected to an electric field or to a magnetic field under which conditions the particles are found to be aligned along the fields of force passing through the suspension.

The desired orientation of the colloidal particles within the polarizing body 12 for use in connection with the headlights or windshield of an automobile is indicated by the broken lines in Fig. 2. These broken lines may be taken as indicating the direction of the polarizing planes of the aligned colloidal particles within the polarizing body. The polarizing plane may coincide with the longitudinal axis of the colloidal particles within the polarizing body. It is, however, not essential that the polarizing planes correspond to the longitudinal axis of the colloidal particles. The broken lines in Fig. 2 and Fig. 3 are not to be construed, therefore, as indicating the position of the colloidal particles within the polarizing body, but merely as indicative of the plane of polarization of the light passing through the body. As shown in Fig. 2, the polarizing body is preferably so positioned on the headlight and windshield of each car that the plane of polarization is at an angle of approximately 45° to the horizontal, and further so that the planes of polarization in the polarizing bodies on the headlight and windshield of each car are parallel. With such an arrangement the driver of a car so equipped would suffer no light loss of any kind because of blocking by his own windshield of light emitted from his own headlights. At the same time, the polarizing body on his windshield would be adapted to completely block the light emanating from the headlight of an approaching car similarly equipped, as the headlight and windshield polarizing screens on the approaching car would have their polarizing planes at right angles to those on the first-mentioned car. The condition arising when two cars equipped in the manner outlined approach is illustrated in Fig. 3, where the lines are illustrative of the polarizing planes of the polarizing bodies on the headlight of one car and windshield of the approaching car. Such an arrangement has a distinct advantage. It has been found that highly polished metal surfaces, such as are now ordinarily used in connection with danger signs along highways, reflect polarized light without altering its characteristics, i. e. without depolarizing it. Where the windshield and headlight of a car are equipped with polarizers whose polarizing axes are at right angles, these highly polished danger signs become invisible to the driver of the car, for the polarized light emanating from his headlights is reflected back from the sign in a polarized condition and is blocked by his windshield.

In operation, it is seen that light from the headlight 11 of car 10 is emitted as plane polarized light to illuminate the highway and other objects ahead of the car. When the ray or beam 19 from the headlight 11, which is plane polarized at an angle of 45° to the horizontal, strikes a non-metallic surface such as illustrated at 18 the rays of reflected or diffused light such as that at 20 are of a depolarized character. The changed character of the ray 20 is here indicated by attaching thereto short wave marks. Consequently, the ray 20, when it reaches the windshield or vizor equipped with the polarizing body 13, has a component which will pass through that body and the windshield so that the object 18 may be readily seen by the operator of the car 10.

Light from the headlight 14 of an approaching car, when polarized with a body of the character shown at 12, will also be polarized in planes at 45° to the horizontal, but at right angles to the planes of polarization of the beam emanating from the headlight 11, so that a ray 21 when incident upon the windshield or vizor equipped with the polarizing body 13 is substantially cut off as that polarizing body is adapted to transmit only light polarized in planes parallel to the polarization planes of light emanating from the headlight 11. Consequently, the operator of car 10 perceives substantially no light emitted directly from the headlight 14 and the glare thereof is accordingly avoided.

It will be obvious that while the combination has been disclosed adapted to polarize light at an angle of 45° to the horizontal, other combinations of headlight and windshield polarizers may be used with substantially equal effect. For example, if the headlights 11 and 14 are equipped with polarizers adapted to plane polarize in a horizontal plane and the windshield of each car is adapted with a polarizing body 13 positioned to pass light polarized only in a vertical plane, the glare from an approaching car will be reduced or substantially eliminated.

Throughout this specification, reference has been made to the use of colloidal polarizing particles in a suspending medium oriented to have their polarizing axes in substantial parallelism. This combination has been mentioned as the preferred polarizing body. Colloidal particles are preferred for it has been found that where the particles used are as large as the wave-length of light transmitted by the polarizer, an appreciable amount of scattering takes place which gives rise to an apparent clouding of the polarizing body. This effect is not observable where colloidal particles, i. e. particles having one dimension shorter than the wave-lengths of the light to be used, are employed.

It is to be deemed within the scope of the invention here described and claimed to employ small polarizing particles suspended in a set suspending medium with their polarizing axes substantially aligned, even though the particles may themselves be larger than what has been defined as colloidal particles. A suspension of colloidal herapathite in a suitable medium has been mentioned as a preferred polarizer. It is to be understood that any suitable polarizing material may be used, such, for example, as the periodides of the sulphate of quinidine, cinchonine and cinchonidine. Any colorless transparent polarizing particles may be used. Suitable polarizing materials may be found among a group comprising inorganic and organic periodides. Herapathite is an example of a suitable organic polarizing periodide. Purpureocobaltchloridesulphateperiodide is an example of a suitable inorganic polarizing periodide.

It is within the scope of this invention that any of the polarizing periodides may be employed with suitable suspending media to form the polarizing bodies used in the illumination system outlined. Preferably, the polarizing particles should be completely colorless. Furthermore, it may be desirable to use polarizing bodies which do not completely block all light, save that polarized in the plane of the polarizing axes of the particles within the bodies, as it may be desirable, in some instances, that the light from the headlights of an approaching car be not completely blocked by the vizor or windshield through which it is viewed.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. In a device for avoiding glare from automobile headlights and the like, the combination comprising an enclosed light source, a lens for transmitting light, a polarizing body associated with said light source and positioned to polarize the beam emanating therefrom, said polarizing body comprising a set suspending medium having a mass of polarizing particles dispersed and immovably embedded therein with their polarizing axes oriented to substantial parallelism, and a visor through which said light is adapted to be viewed comprising a similar polarizing body adapted to transmit plane polarized light substantially without scattering and positioned to substantially cut off the polarized light emanating from said headlight irrespective of the angle at which said light impinges upon said vizor.

2. In a device for avoiding glare from automobile headlights and the like, a headlight adapted to project a beam of light, a polarizing body associated with said headlight and interposed in the path of said beam and comprising a set suspending medium having dispersed and immovably embedded therein a mass of polarizing particles with their polarizing axes aligned in substantial parallelism, and a cooperating vizor through which light may be viewed comprising a similar polarizing body adapted to transmit plane polarized light substantially without scattering and positioned so as to transmit light which is polarized in a plane substantially perpendicular to the plane of polarization of the beam emitted from said headlight and adapted to substantially absorb light vibrating in a plane parallel to the plane of polarization of said beam.

3. In a device for avoiding glare from automobile headlights and the like, a headlight adapted to project a beam of light, a polarizing body associated with said headlight and interposed in the path of said beam and comprising a set suspending medium having dispersed and immovably embedded therein a mass of colloidal polarizing particles with their polarizing axes aligned in substantial parallelism, and a cooperating vizor through which light may be viewed comprising a similar polarizing body positioned so as to transmit light which is polarized in a plane substantially perpendicular to the plane of polarization of the beam emitted from said headlight.

4. In a device for avoiding glare from automobile headlights and the like, a headlight adapted to project a beam of light, a polarizing body associated with said headlight and interposed in the path of said beam and comprising a set suspending medium having dispersed and immovably embedded therein a mass of colloidal particles of herapathite with their polarizing axes aligned in substantial parallelism, and a cooperating vizor through which light may be viewed comprising a similar polarizing body positioned so as to transmit light which is polarized in a plane substantially perpendicular to the plane of polarization of the beam emitted from said headlight.

5. In a device for avoiding glare from automobile headlights and the like, a headlight adapted to project a beam of light, a polarizing body associated with said headlight and interposed in the path of said beam and adapted to substantially plane polarize said beam, and a cooperating visor through which light may be viewed comprising a set suspending medium having dispersed and immovably embedded therein a mass of polarizing particles with their polarizing axes aligned in substantial parallelism, said particles being of such size and so positioned that said visor transmits light substantially without scattering, and said visor being positioned to substantially cut off the polarized light emanating from said headlight irrespective of the angle at which said light impinges upon said visor.

6. In a device for avoiding glare from automobile headlights and the like, a headlight adapted to project a beam of light, a polarizing body associated with said headlight and interposed in the path of said beam and adapted to substantially plane polarize said beam, and a cooperating visor showing substantially no scattering of light transmitted therethrough, comprising a set suspending medium having dispersed and immovably embedded therein a mass of polarizing particles with their polarizing axes aligned in substantial parallelism and positioned to substantially absorb light vibrating in a plane parallel to the plane of vibration of the light in said beam.

7. In a device for avoiding glare from automobile headlights and the like, a headlight adapted to project a beam of light, a polarizing body associated with said headlight and interposed in the path of said beam and adapted to substantially plane polarize said beam, and a cooperating visor showing substantially no scattering of light transmitted therethrough, comprising a set suspending medium having dispersed and immovably embedded therein a mass of particles of herapathite with their polarizing axes aligned in substantial parallelism and positioned so as to transmit light which is polarized in a plane substantially perpendicular to the plane of polarization of the beam emitted from said headlight.

8. In a device for avoiding glare from automobile headlights and the like, a headlight adapted to project a beam of light, a polarizing body associated with said headlight and interposed in the path of said beam and adapted to substantially plane polarize said beam, and a cooperating visor through which light may be viewed comprising a set suspending medium having dispersed and immovably embedded therein a mass of colloidal particles of herapathite with their polarizing axes aligned in substantial parallelism and positioned to substantially cut off the polarized light emanating from said headlight irrespective of the angle at which said light impinges upon said visor.

9. In a device for avoiding glare from automobile headlights and the like, a headlight adapted to project a beam of light, a polarizing body associated with said headlight and interposed in the path of said beam and adapted to substantially plane polarize said beam, and a cooperating visor showing substantially no scattering of light transmitted therethrough comprising a set suspending medium having dispersed and immovably embedded therein a mass of particles of a polarizing periodide with their polarizing axes aligned in substantial parallelism and positioned so as to transmit light which is polarized in a plane substantially perpendicular to the plane of polarization of the beam emitted from said headlight.

10. The combination comprising a headlight, a lense, a polarizing body interposed in the path of a beam emitted from said headlight and adapted to substantially plane polarize said beam and a cooperating visor adapted to transmit plane polarized light and comprising a set suspending medium having a mass of polarizing particles dispersed and immovably embedded therein with their polarizing axes arranged in substantial parallelism, said visor being positioned to transmit plane polarized light vibrating in a plane substantially perpendicular to the plane of vibration of the beam emitted from said headlight, the polarizing particles embedded in said visor being of such size and so positioned that the visor transmits light substantially without scattering.

EDWIN H. LAND.